United States Patent
Figov et al.

(10) Patent No.: US 10,769,907 B2
(45) Date of Patent: *Sep. 8, 2020

(54) COUNTER-FLOW DETECTION IN COMPRESSED VIDEO

(71) Applicant: Verint Systems Ltd.

(72) Inventors: Zvi Figov, Modiin (IL); Nir Naor, Ramat-Hasharon (IL)

(73) Assignee: VERINT SYSTEMS LTD., Herzelia, Pituach (IL)

( * ) Notice: Subject to any disclaimer, the term of this patent is extended or adjusted under 35 U.S.C. 154(b) by 57 days.

This patent is subject to a terminal disclaimer.

(21) Appl. No.: 16/240,367

(22) Filed: Jan. 4, 2019

(65) Prior Publication Data

US 2019/0197849 A1 Jun. 27, 2019

Related U.S. Application Data

(63) Continuation of application No. 15/617,418, filed on Jun. 8, 2017, now Pat. No. 10,176,684.

(51) Int. Cl.
*G08B 13/196* (2006.01)
*G06K 9/00* (2006.01)
(Continued)

(52) U.S. Cl.
CPC ... *G08B 13/19613* (2013.01); *G06K 9/00758* (2013.01); *G06K 9/00771* (2013.01);
(Continued)

(58) Field of Classification Search
CPC ........ G08B 13/19613; G08B 13/19682; G06K 9/00758; G06K 9/00771; G06K 9/40; G06K 9/78; G06T 7/215; G06T 7/248; G06T 2207/10016; G06T 2207/20021; G06T 2207/30232
See application file for complete search history.

(56) References Cited

U.S. PATENT DOCUMENTS 8,068,640 B2  11/2011  Loos
9,183,512 B2  11/2015  Lehmann et al.
(Continued)

FOREIGN PATENT DOCUMENTS

EP    1631073    3/2006

OTHER PUBLICATIONS

Search Report, dated Aug. 9, 2018, received in connection with EP Patent Application No. 18176792.2.
(Continued)

*Primary Examiner* — Katrina R Fujita
(74) *Attorney, Agent, or Firm* — Meunier Carlin & Curfman LLC

(57) ABSTRACT

A system and method to determine a flow direction automatically so that counter-flow motion may be detected without user calibration is disclosed. The system and method utilize information available from existing video compression algorithms to sense motion and determine a flow direction. Once a flow direction for an area is determined, the system and method can detect counter-flow motion using compressed video without any decompression, thereby improving the speed of detection and simplifying the computational complexity. These improvements facilitate counter-flow alarms and expand the information available to a user monitoring the video.

19 Claims, 8 Drawing Sheets

(51) Int. Cl.
G06K 9/40 (2006.01)
G06K 9/78 (2006.01)
G06T 7/246 (2017.01)
G06T 7/215 (2017.01)

(52) U.S. Cl.
CPC ............... *G06K 9/40* (2013.01); *G06K 9/78* (2013.01); *G06T 7/215* (2017.01); *G06T 7/248* (2017.01); *G08B 13/19682* (2013.01); *G06T 2207/10016* (2013.01); *G06T 2207/20021* (2013.01); *G06T 2207/30232* (2013.01)

(56) References Cited

U.S. PATENT DOCUMENTS

2006/0045354 A1 3/2006 Hanna et al.
2008/0112595 A1 5/2008 Loos
2009/0060276 A1 3/2009 Yu et al.
2011/0037852 A1 2/2011 Ebling et al.

OTHER PUBLICATIONS

Bhartiya, D., et al., "Document Segmentation for Labeling with Academic Learning Objectives," Proceedings of the 9th International Conference on Educational Data Mining, 2016, pp. 282-287.
Biswas, S., et al., "Anomaly detection in compressed H.264/AVC Video," Multimedia Tools & Applications, vol. 74, Issue 24, 2015, pp. 11099-11115.
Biswas, S., et al., "Anomaly detection via short local trajectories," Neurocomputing, vol. 242, 2017, pp. 63-72.
Biswas, S., et al., H.264 Compressed Video Classification Using Histogram of Oriented Motion Vectors (HOMV), IEEE International Conference on Acoustics, Speech and Signal Processing (ICASSP), 2013, 5 pages.
Biswas, S., "Motion based Event Analysis," Thesis, 2014, 108 pages.
Biswas, S., et al., "Real-time Anomaly Detection in H.264 Compressed Videos," Fourth National Conference on Computer Vision, Pattern Recognition, Image Processing and Graphics (NCVPRIPG), 2013, 4 pages.
Biswas, S., et al., "Short Local Trajectory based moving anomaly detection," Proceedings of the Indian Conference on Computer Vision Graphics and Image Processing (ICVGIP), 2014, 8 pages.
Biswas, S., et al., "Sparse Representation based Anomaly Detection Using HOMV in H.264 Compressed Videos," International Conference on Signal Processing and Communications (SPCOM), 2014, 5 pages.
Biswas, S., et al., "Sparse Representation based Anomaly Detection with Enhanced Local Dictionaries," IEEE International Conference on Image Processing (ICIP), 2014, 5 pages.
Biswas, S., et al., "Super-pixel Based Crowd Flow Segmentation in H.264 Compressed Videos," IEEE International Conference on Image Processing (ICIP), 2014, 5 pages.
Boghossian, B.A., et al., "Image Processing System for Pedestrian Monitoring using neural classification of normal motion patterns," Measurement and Control, vol. 32, Issue 9, 1999, pp. 261-264.
Bouchafa, S., et al., "Automatic Counterflow Detection in Subway Corridors by Image Processing," ITS Journal, vol. 6, No. 2, 2001, pp. 97-123.
Guler, S., et al., "Contextual video clip classification," Applied Imagery Pattern Recognition Workshop (AIPR), 2012, pp. 1-8.
Kiryati, N., et al., "Real-time Abnormal Motion Detection in Surveillance Video," 19$^{th}$ International Conference on Pattern Recognition (ICPR), 2008, 4 pages.
Krausz, B., et al., "Loveparade 2010: Automatic video analysis of a crowd disaster," Computer Vision and Image Understanding, vol. 116, Issue 3, 2012, pp. 307-319.
NiceVision Video Analytics brochure, Nice® Systems, 2012, 4 pages.
Wu, Z., et al., "Improving Countertlow Detection in Dense Crowds with Scene Features," Pattern Recognition Letters, 2013, 23 pages.

COUNTER-FLOW DETECTION IN COMPRESSED VIDEO

CROSS-REFERENCE TO RELATED APPLICATIONS

This Application claims priority to and is a continuation of U.S. patent application Ser. No. 15/617,418, filed Jun. 8, 2017, which is incorporated herein by reference for all purposes as if fully set forth herein.

FIELD OF THE INVENTION

The present disclosure relates to detecting motion in video and, more specifically, to a system and method for detecting movement in compressed video that is in a direction opposite to a determined flow direction.

BACKGROUND

Generally speaking, automatically detecting abnormal behavior in surveillance video is highly desirable. Automatic detection is difficult, however, because abnormal behavior is often based on contextual information and fails to conform to universal rules. Automatic detection is also difficult because of the large volume of video data that is available from video surveillance systems. For example, a modest video surveillance system with 10 cameras, each capturing video at a reduced frame rate of 5 frames per second (fps), captures over 4 million frames for analysis in a single day.

One type of abnormal behavior is movement in a direction different from a normal, preferred, and/or designated direction (i.e., counter-flow motion). For example, transportation hubs (e.g., airports, subways, etc.) may have designated directions for people to follow in certain areas (e.g., security checkpoints, entrances, exits, gates, etc.). Likewise, roads, driveways, and/or parking-lots/decks may have designated directions for vehicles to follow in certain areas (e.g., on/off ramps, loading zones, entrances/exits, etc.).

Existing solutions for automatically detecting counter-flow motion typically require a user to designate a flow direction (i.e., normal direction, main direction) for a particular area. In these solutions, the user must calibrate the system by assigning a flow direction. Once calibrated, the system cannot accommodate changes to the flow direction automatically and often can only accommodate a single flow direction for a given scene. A need, therefore, exists for a method to automatically determine a flow direction so that counter-flow motion may be detected automatically without user calibration.

Computer-vision algorithms for detecting counter-flow typically operate on images (i.e., frames) in a video stream (i.e., video). For example, particular features in the images may be identified and then tracked frame-to-frame in the video to determine motion. Because these algorithms operate on features defined by pixels, high-quality images (i.e., frames) are important. Most surveillance systems, however, compress video to improve storage, speed, and/or bandwidth, which reduces the quality of each frame. As a result, most computer vision algorithms must include additional operations associated with decoding the compressed video into its decompressed state before detecting motion. These added operations are computationally complex and time consuming, thereby slowing the process of automatically detecting counter-flow. The added operations, therefore, make detecting counter-flow in (near) real time unrealistic. An additional need, therefore, exists for a system and method to detect counter-flow motion using compressed video without any decompression operations.

Detecting counter-flow motion using compressed video may provide (near) real time detection of counter-flow motion. Real-time detection is highly desirable because it enables alarms to be activated as the counter-flow motion occurs. In addition, near real time detection can provide indications of counter-flow motion in a graphical user interface to allow a user to easily navigate to, and interact with, video that has counter-flow motion. These applications could influence safety and security applications significantly. Thus, an additional need exists for alarms based on (near) real-time detection of counter-flow movement. Further, an additional need also exists for a video management system (VMS) having a graphical user interface (GUI) that provides an indication of the presence and/or extent of counter-flow motion in a video and that facilitates easy navigation to, interaction with, and/or analysis of the portions of the video containing counter-flow motion.

SUMMARY

Accordingly, in one aspect, the present disclosure embraces a method for detecting counter-flow motion in a compressed video of a scene. The method begins by receiving frames of the compressed video and determining a flow direction for a group of frames. Counter-flow motion is then detected by comparing motion vectors obtained for each frame to the determined flow direction.

The determination of the flow direction includes several operations. Motion vectors, which each include a magnitude and an angle, are obtained from each frame in a group of frames. The motion vectors are then filtered to remove motion vectors that correspond to noise (i.e., not motion), and the angles of the remaining motion vectors are used to compute a frame histogram. Based on the frame histogram, a frame direction is derived and added to a flow histogram of frame directions. This process is repeated so that the frame histogram is populated with frame directions for other frames in the group. A flow direction may then be determined based on the flow histogram of frame directions.

In an exemplary embodiment of the method, each frame in the compressed video includes macroblocks that each have a motion vector indicating the macroblock's motion relative to a reference frame. The motion vector is comprised of a magnitude that corresponds to the displacement of the motion and an angle that corresponds to the direction of the motion.

In another exemplary embodiment of the method, the operation of computing a frame histogram includes binning the angles of the frame's motion vectors into equal-sized bins that span from zero to 360 degrees (i.e., 0-2$\pi$ radians). In some cases, the binning may be weighting by the magnitude of the motion vectors. In addition, the number of bins that span from zero to 360 degrees may be based on an expected variation in the angles of the motion vectors. Further, deriving a frame direction may include selecting the two largest adjacent bins in the frame histogram and determining an average bin value based on the bin counts in each of the two bins. A frame direction may then be derived as the angle corresponding to the average bin value.

In another exemplary embodiment of the method, filtering the motion vectors may include receiving an expected magnitude range and removing motion vectors that are larger or smaller than the expected magnitude range.

In another exemplary embodiment of the method, the group of frames includes only frames in which motion is detected, wherein the detection of motion in each frame is based on the motion vectors.

In another exemplary embodiment of the method, determining a flow direction includes binning the frame directions into equal-sized bins that span from zero to 360 degrees and determining the flow direction as a range of angles corresponding to the two largest adjacent bins. Accordingly, in some embodiments, the counter-flow motion is motion in a direction within a range of angels that are 180 degrees separated from a range of angles corresponding to the flow direction. In some cases, the number of frames in the group of frames is determined by the shape of the flow histogram. For example, when the two largest adjacent bins in the flow histogram have values larger than all other bins by an amount greater than a frame threshold, the repetition of adding frame directions to the flow histogram may be concluded and the flow direction may be determined.

In another exemplary embodiment of the method, the flow direction is continuously updated using a sliding window to select groups of frames.

In another exemplary embodiment of the method, the flow direction is updated periodically on a time schedule.

In another exemplary embodiment of the method, a motion mask is created for each frame. Each pixel of the motion mask may have one of two values: a first value corresponding to counter-flow motion and a second value corresponding to motion other than counter-flow motion. Accordingly, in some cases, a frame may be tagged as having counter-flow motion when the number of first value pixels in the motion mask exceeds a counter-flow motion threshold. In some cases, the extent of the counter-flow motion may be determined as the percentage of the pixels in the motion mask that have the first value. Accordingly, an alarm may be triggered in two ways. First, an alarm may be triggered when a number of consecutive frames tagged as having counter-flow motion exceeds a first alarm threshold. Second, an alarm may be triggered when the extent of the counter-flow motion in a tagged frame exceeds a second alarm threshold. In addition, frames tagged has having counter-flow motion of a particular extent may be indicated in a graphical user interface (GUI) of a video management system (VMS).

In another aspect, the present disclosure embraces a video surveillance system having counter-flow motion detection. The system includes at least one video camera capturing video of a scene and a video processing unit (VPU) that receives the video from the cameras and forms it into compressed video. The system also includes a video management system (VMS) that has a processor and a memory for storing software. When executed, the software configures the processor to perform the method and method embodiments described above.

In another aspect, the present disclosure embraces a non-transitory tangible computer readable medium containing computer readable instructions that when executed by a processor of a computer cause the computer to execute the method and method embodiments described above.

The foregoing illustrative summary, as well as other exemplary objectives and/or advantages of the disclosure, and the manner in which the same are accomplished, are further explained within the following detailed description and its accompanying drawings.

Other systems, methods, features, and/or advantages will be or may become apparent to one with skill in the art upon examination of the following drawings and detailed description. It is intended that all such additional systems, methods, features and/or advantages be included within this description and be protected by the accompanying claims.

DETAILED DESCRIPTION

Figure 1:
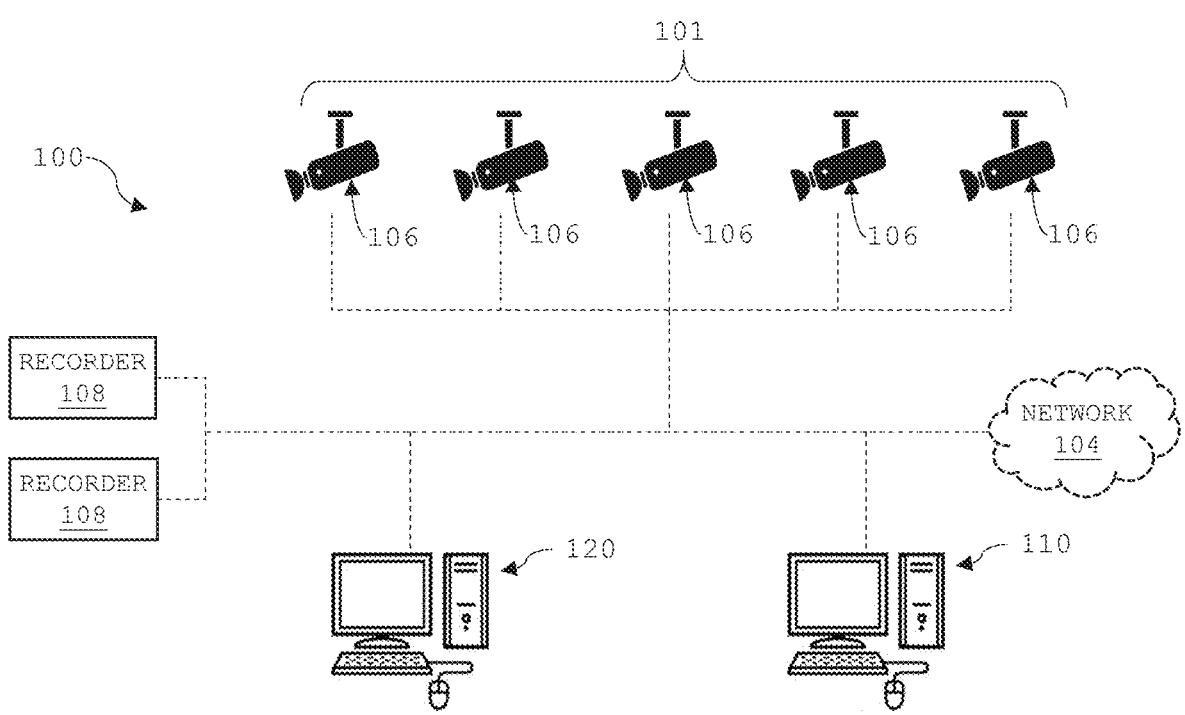
FIG. 1 schematically depicts a video surveillance system according to an exemplary embodiment of the present disclosure.

An exemplary video surveillance system for detecting counter-flow motion is shown in FIG. 1. The system includes a plurality of video cameras 101. Each video camera 106 can cover an area in a facility (e.g., airport, subway, etc.) or an outside location (e.g., parking lot, roadway, point of interest). Each camera may have a fixed point of view or may be movable in one or more directions (e.g., pan, tilt, zoom) to scan a larger area.

The cameras 101 are communicatively coupled, either wired or wirelessly, to one or more recorders 108. The recorders 108 store the video captured by the cameras to a database (not shown). The database may be integrated with the one or more recorders 108 or may be remotely connected to the one or more recorders 108 via a network 104.

The cameras are also connected to a video processing unit 120. The video processing unit (VPU) converts the raw video captured by each camera 106 into compressed video. While shown explicitly in FIG. 1, the VPU 120 may be integrated with one or more recorders 108 or one or more cameras 106. In an exemplary embodiment, a VPU 120 may compress the video using a variety of compression algorithms (e.g., MPEG, H.261, H.263, etc.). The video compression is typically lossy and eliminates spatial and temporal redundancy through either intra-frame compression (i.e., frame compressed as a still image) and/or inter-frame compression.

Inter-frame compression includes compressing frames according to square-shaped groups of adjacent pixels called macroblocks. The macroblocks are compared from one frame to the next and relative to a reference frame. Using this approach, the compression factor for an object (e.g., a face) may be kept constant, even as the object moves through the scene.

Figure 2A:
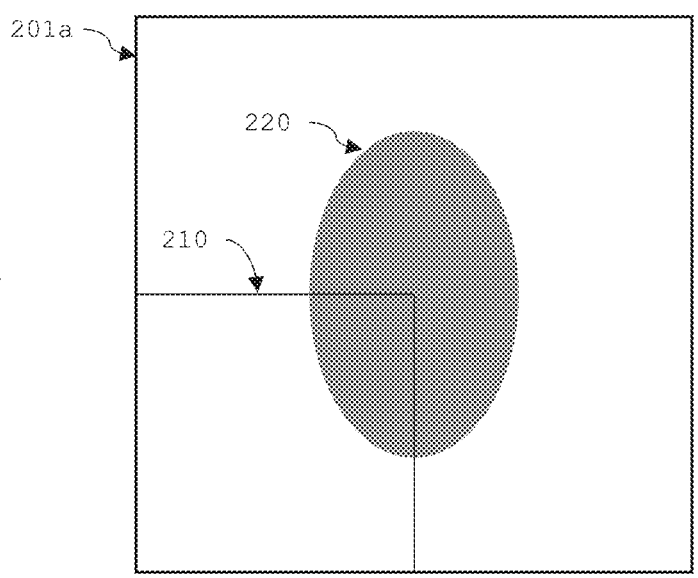
FIG. 2A graphically depicts a macroblock in a reference frame according to an embodiment of the present disclosure.

FIG. 2A illustrates an exemplary reference frame 201a containing exemplary macroblock 210 that includes a portion of an object 220. In a subsequent frame 201b, the macro block 210 is moved according to the motion of the object 220 so that it still contains the same portion of the object 220.

Figure 2B:
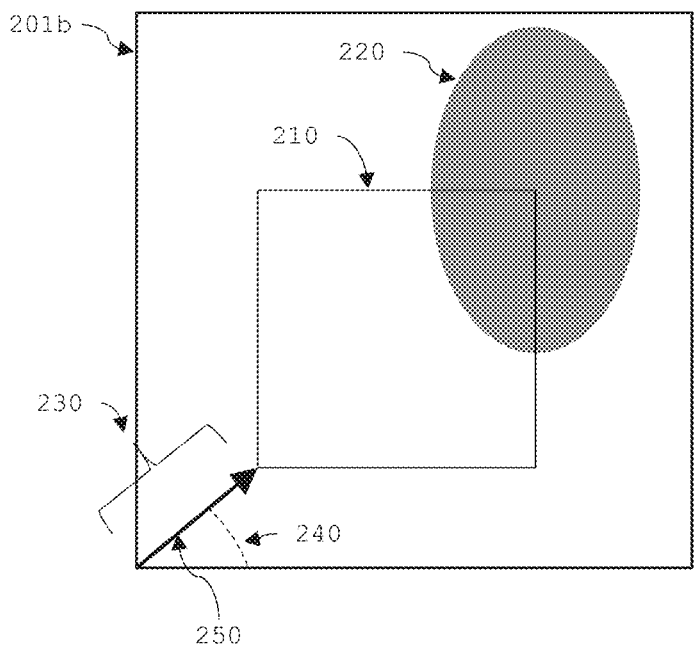
FIG. 2B graphically depicts a video frame showing the movement of the macro block of FIG. 2A as represented by a corresponding motion vector according to an embodiment of the present disclosure.

The compression uses motion vectors to describe the motion of macroblocks from one frame to another. As shown in FIG. 2B, a motion vector 250 has a magnitude 230 that describes the displacement of the macroblock 210 and an angle 240 that describes the direction of movement of the macroblock 210.

Because motion vectors correspond to macroblocks and because macroblocks correspond to moving objects, motion vectors may be used to obtain information about the movement of objects (e.g., people) within a scene. Accordingly, movement information may be obtained from compressed video without the need to decompress the video and apply computer vision analysis. Instead, motion vector information, which is already computed for the purpose of compression, may be repurposed for the purpose of determining a flow direction and detecting counter-flow movement.

Returning to FIG. 1, the surveillance system also includes a video management system (VMS) 110 that is communicatively coupled to the cameras 101, the VPU 120, and the recorders 108. The VMS 110 typically runs software to analyze and interact with the compressed video from the cameras 110. Accordingly, the VMS may provide a graphical user interface (see FIG. 8) for a user to interact with video from one or more of the cameras 101 in (near) real time or from recordings.

Figure 3A:
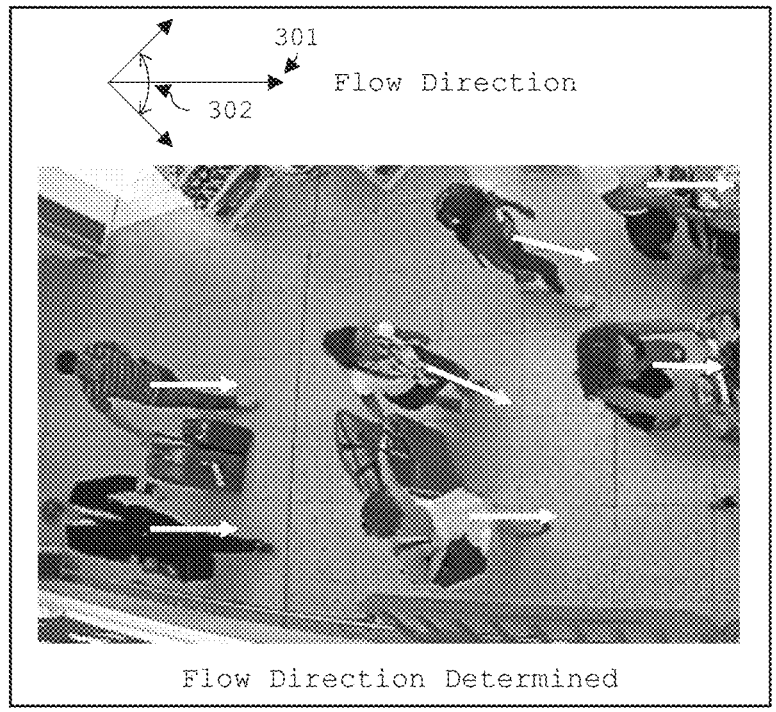
FIG. 3A graphically depicts normal motion in a scene according to an embodiment of the present disclosure.
Figure 3B:
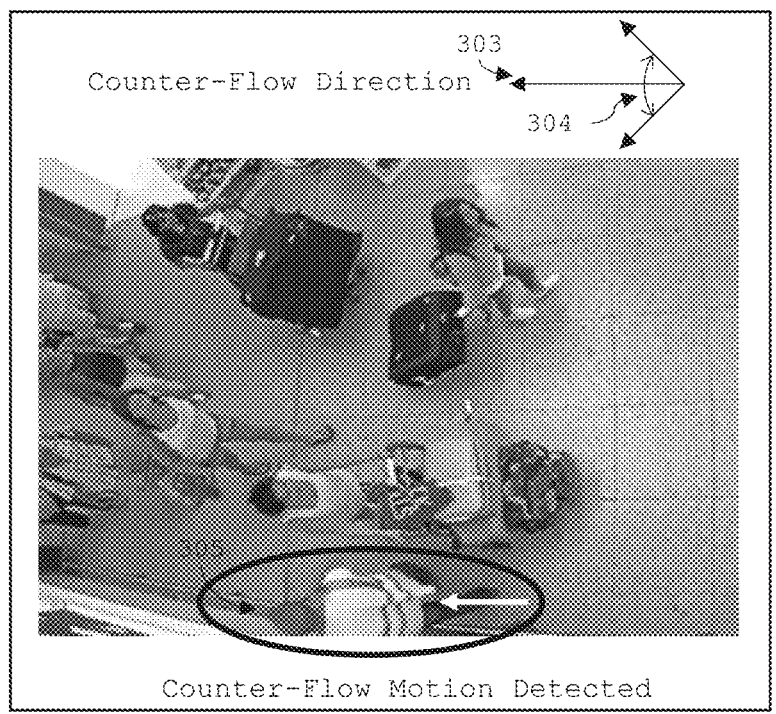
FIG. 3B graphically depicts counter-flow motion in the scene of FIG. 3A according to an embodiment of the present disclosure.

FIGS. 3A and 3B illustrate frames from compressed video of a scene. The scene shown in FIG. 3A depicts a passageway in an airport and shows passengers moving in a (normal) flow direction 301. Nominally, the flow direction 301 is a single angle but in practice, there is some expected variation in the flow direction. Accordingly, flow direction is typically defined as a range of angles 302 that accommodates the expected variations in the angles movement.

FIG. 3B depicts the same airport passageway as shown FIG. 3A. Here is it can be seen that an individual 305 is moving in a direction opposite to the flow direction. Typically, counter-flow movement is defined as movement in a direction that is 180 degrees separated from the flow direction. Like flow direction, the counter-flow direction 303 is defined as a range of angles 304 that accommodates expected variations. A narrow range of angles 304 may fail to detect some counter-flow movements (i.e., false negative), while a wide range of angles 304 may detect counter-flow movement incorrectly (i.e., false positive). Accordingly, the range of angles that define the counter-flow directions may be selected based on an expected movement variation for a particular scene. This implies that different scenes in a surveillance system may have differently defined counter-flow direction ranges. What is more, the range of angles may vary based on the movement within a scene because crowded scenes typically have less expected movement variation than scenes with only a few moving individuals.

As disclosed herein, the motion vectors in compressed video may be used to determine a flow direction (FIG. 3A). After a flow direction 301 is determined (i.e., defined), the motion vectors in each frame may be used to detect counter-flow motion (FIG. 3B). The determination of the flow direction may occur at one time or multiple times. For example, the flow direction may be continually updated to accommodate changes in a flow pattern (e.g., arriving and departing crowds). This changing flow direction be used to detect times of arriving and departing crowds. In general, a continually updated flow direction can be linked with times to provide information (i.e., metadata) that is useful for traffic planning and routing (or re-routing). The flow direction may also be updated periodically on a schedule, or according to the amount of movement detected in a scene. For example, an area with little movement could have flow direction determined less often than an area (i.e., scene) with more movement.

The operation of determining a flow direction may occur automatically without user participation or may include user participation at one or more steps. For example, the VMS 110 may hypothesize movement in a particular flow direction from a group of frames from a camera 106. The VMS may then query a user to confirm the hypothesized flow direction before it is used to detect counter-flow motion. In addition, a user may adjust the ranges of the angles of flow direction and/or counter-flow direction to make the detection more or less sensitive. In some possible embodiments, a user may define regions within a scene and the VMS may compute flow directions for each defined region within a scene.

Figure 4:
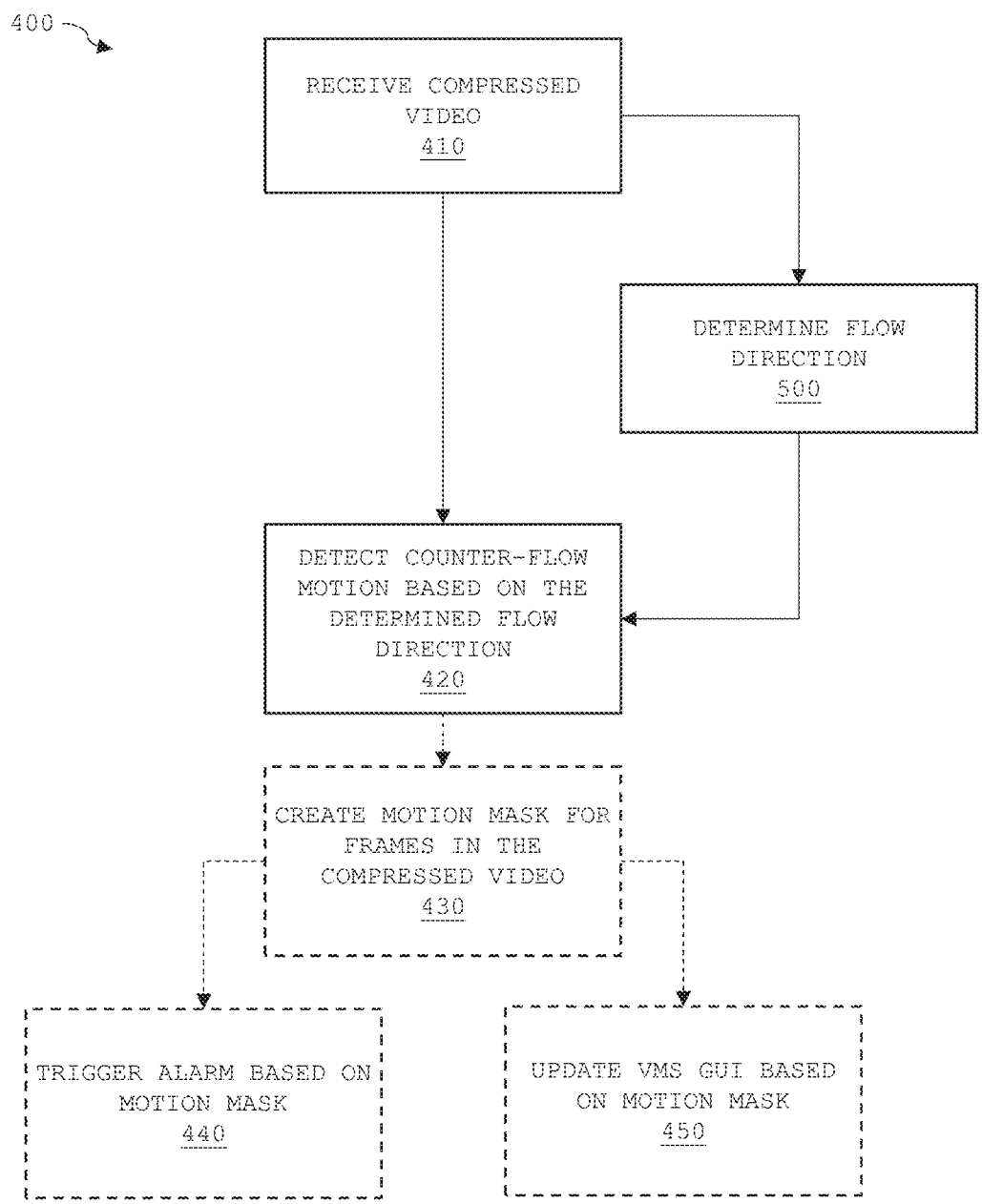
FIG. 4 depicts a flow diagram of a method for detecting counter-flow motion in a compressed video of a scene according to an exemplary embodiment of the present disclosure.

A flow diagram of an exemplary method for detecting counter-flow motion 400 is shown in FIG. 4. Compressed video is received 410. The compressed video is comprised of a sequence of frames (i.e., images). A group of frames may be selected to determine 500 a flow direction. The group may be a group of sequential frames or may be a group of non-sequential frames that all contain movement. The number of frames in the group may be fixed (e.g., 100 frames). For example, when the determination of the flow direction is continuous, the selection of the group of frames may be accomplished using a sliding window (e.g., of a fixed width). The number of frames in the group of frames may be variable and depend on the frames analyzed. For example, the determination of flow direction may nominally require 100 frames but if before all 100 frame are analyzed, the flow direction can be easily determined with a high degree of certainty, then the determination of the flow direction may conclude before all 100 frames are analyzed. After the flow direction is determined, frames of the compressed video may be analyzed to detect 420 counter flow motion.

Figure 5:
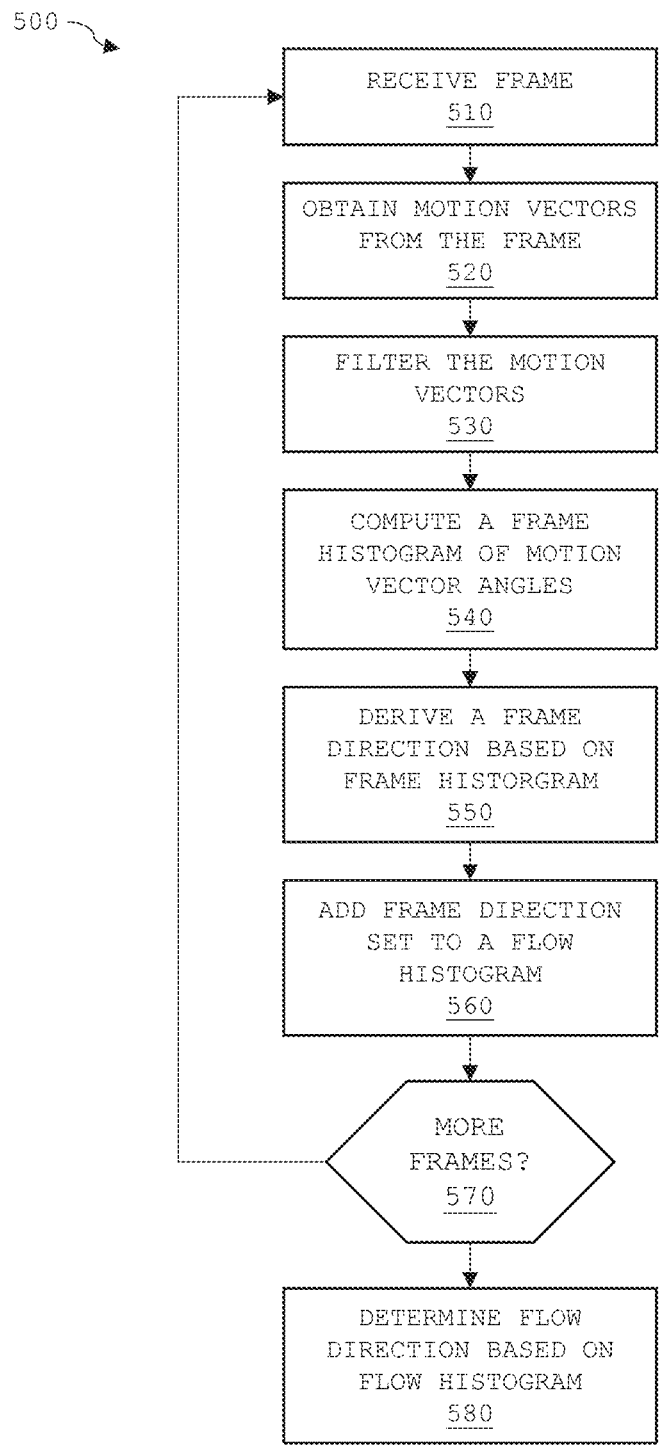
FIG. 5 depicts a flow diagram of a method for determining a flow direction according to an exemplary embodiment of the present disclosure.

FIG. 5 illustrates the details of how a flow direction for a group of frames may be determined according to an exemplary embodiment of the present disclosure. A frame of compressed video is received 510 and the motion vectors in the frame are obtained 520. For example, a motion-vector image may be obtained in which motion vectors for each macro block are displayed spatially according to the macroblock.

The motion vectors are filtered 530 to remove any motion vectors corresponding to noise. The filtering step is useful because the primary purpose of the motion vectors in the compressed frame is for compression and is not to track a particular kind of movement (e.g., a human walking).

Accordingly, it is useful to only retain those motion vectors that are likely to correspond with expected movement. For example, movement of a human walking may have an expected magnitude range. Motion vectors that are larger or smaller than the expected magnitude range are therefore unlikely to correspond to humans walking. In other words, very large motion vectors may correspond to a displacement that is impossible for a human to traverse, while very small motion vectors may correspond to a displacement that is unlikely to be walking. In practice, this filtering may be accomplished by applying a median or mean filter to the motion vector magnitudes.

After the motion vectors are filtered 530, a frame histogram of motion vector angle is computed 540. To accomplish this, the range of possible motion vector angles (e.g., 0-360 degrees) may divided equally into equal-sized bins. The angles of the filtered motion vectors are binned into the bins to compute the frame histogram. Nominally, each angle is binned as a single count in the histogram; however, in some possible embodiments the count for each angle may be scaled according to the motion vector's magnitude. This scaling may favor movements with a large displacement in the histogram, which may help in deriving a frame direction (e.g., may accelerate the derivation).

A frame direction is derived 550 based on the computed frame histogram. To accomplish this, the bin with the largest bin count (i.e., having the most number of binned motion vectors angles) may be identified along with the next largest adjacent bin. Then an average bin value based on the bin counts or the two selected bins may be determined. From this average bin value, a corresponding angle maybe derived. This angle is considered the frame direction. For example, if a first bin (i.e., 1) has a bin count of 50 and a second bin (i.e., 2) has a bin count of 100, then the average bin value is ([50*1]+[100*2])/150 or 1.7. If the first and second bins each span 45 degrees, then the derived frame direction is (1.7*45) or 76.5 degrees.

Figure 6:
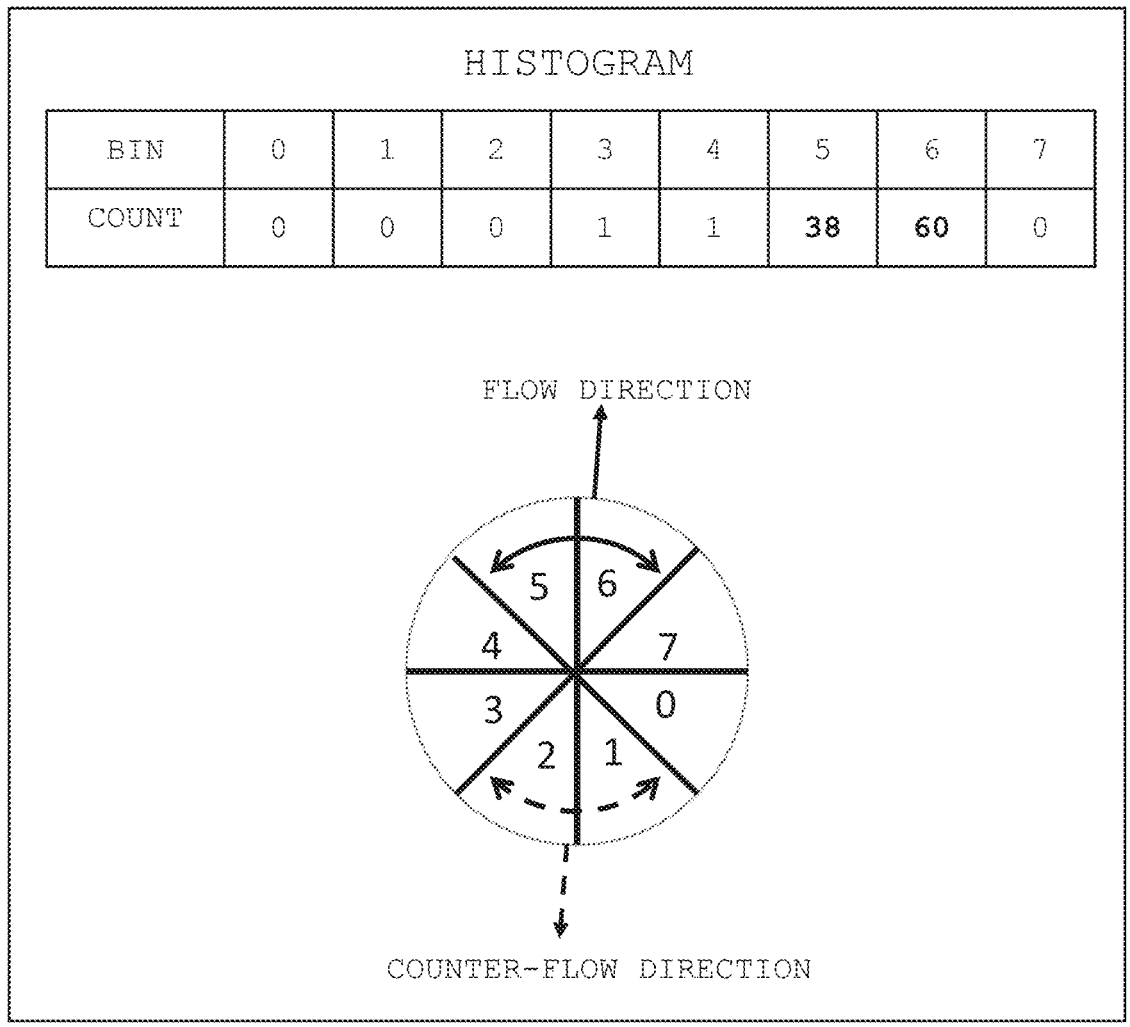
FIG. 6 graphically depicts the determination of a flow direction from a flow histogram according to an embodiment of the present disclosure.

After derivation, the frame direction is added to a flow histogram and the process is repeated for another frame to cumulatively build the flow histogram. FIG. 6 shows an exemplary a flow histogram of derived frame directions for a group of 100 frames. The histogram revels that 60 of the frames have a frame direction in the range of angles determined by bin 6. The next highest bin (i.e., bin 5) has 38 frames. From this histogram, the flow direction may be determined (see FIG. 5, step 580) as the range of angles corresponding to bins 5 and 6. Accordingly, the counter-flow direction may be determined as the range of angles corresponding to the bins 1 and 2, which are 180 degrees separated from the flow direction bins.

In some embodiments, the same procedure used for deriving frame directions from a frame histogram may be used to determine a flow direction from a flow histogram. As shown in FIG. 6, the flow direction may not correspond exactly with a particular bin boundary. In this case, the angular range of flow direction may be centered on the determined flow direction and it may be possible to adjust the adjust the range of flow direction angles to be any range, independent of the angular span of each bin. In addition, it may be possible to set the counter-flow direction to be any direction separated from the flow direction. For example, a counter flow may be set at 90 degrees to the flow direction for situations at an intersection.

Figure 7A:
FIG. 7A graphically depicts the counter-flow motion in the scene of FIG. 2B with motion vectors.

Once flow/counter-flow directions are determined, then each frame of the compressed video may be analyzed to detect counter-flow motion. FIG. 7A graphically depicts the frame shown in FIG. 3B with the extracted motion vectors overlaid and spatially arranged according to the macroblocks of the compression (i.e., a motion vector image). By comparing each motion vector in the frame to the determined counter-flow direction, counter-flow motion may be detected. Further, by using the spatial information of the macroblock associated with the motion vector, the position of the counter-flow motion within the frame (i.e., scene) may be determined and displayed in a motion mask.

Figure 7B:
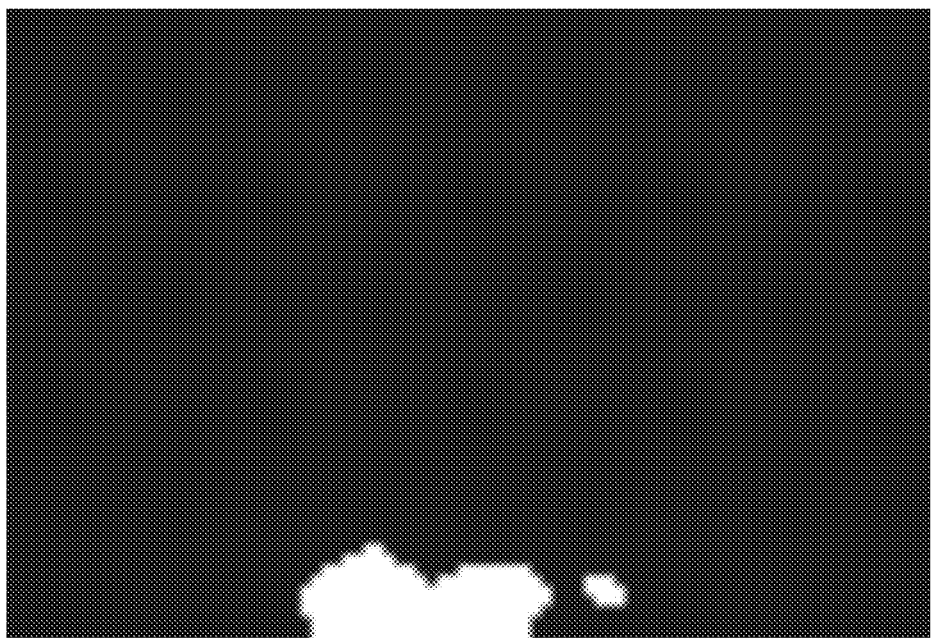
FIG. 7B graphically depicts a motion mask corresponding to FIG. 7A.

FIG. 7B depicts the motion mask for the motion vectors of FIG. 7A. For the embodiment shown, the pixels of the motion mask may take on one of two values. As shown, a first value (i.e., white) indicates counter-flow motion, while a second value (i.e., black) indicates no counter-flow motion (i.e., no motion or motion in a direction other than the counter-flow direction). The extent of counter-flow motion in a tagged frame may be determined as a percentage of the counter-flow pixels in the motion mask. In some possible embodiments, the pixel values of the motion mask may be adjusted based on additional information from the motion vectors. For example, the magnitude of the motion vectors may scale or color the pixels so a user may also observe the displacement of the counter-flow motion.

A motion mask for a frame may be used as a criterion for tagging the frame as having (or not having) counter-flow motion. For example, a frame may be tagged as having counter-flow motion when the number (or percentage) of pixels having values corresponding to counter-flow motion exceed a counter-flow motion threshold. Once tagged, frames having counter-flow motion may be stored, searched, or recalled differently. Further, tagged frames may trigger responses (e.g., alarms, reports, door locks, tire spikes, gate closures, image capturing, police/security summoning, spot lights, etc.).

An alarm may be trigged as a result of a frame tagged as having counter-flow motion. The alarm may include an indication (i.e., auditory, visual, or tactile) that is transmitted to a particular person (e.g., security, VMS operator) or broadcast to an area (e.g., the area of the scene).

To reduce or prevent false alarms, various algorithms may be used for triggering. For example, an alarm may be triggered only when a number of consecutive frames tagged as having counter-flow motion exceeds an alarm threshold. In another example, an alarm may be triggered when the extent of counter-flow motion in a frame exceeds an alarm threshold. In addition, these triggering algorithms may process (i.e., filter) the motion masks before a threshold comparison.

Figure 8:
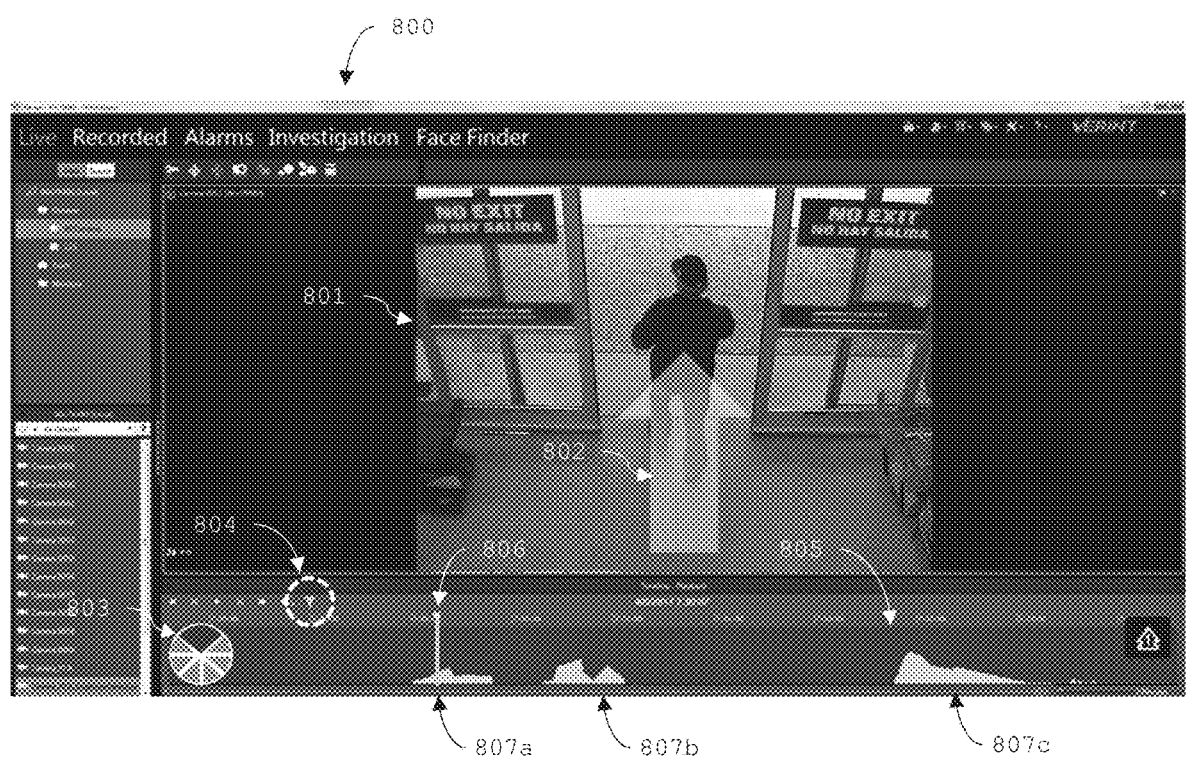
FIG. 8 graphically depicts a graphical user interface (GUI) of a video management system (VMS) showing the determined flow direction and a timeline having indications of the time and the extent of counter-flow motion.

By detecting counter-flow motion, the counter-flow motion may be displayed on a timeline of a video stream. This may allow a user to easily interact with the portions of the video having counter-flow motion. An exemplary graphical user interface (GUI) 800 of a video management system (VMS) 110 operating in a surveillance system having counter-flow detection 100 is shown in FIG. 8. In addition to displaying video 801 from a camera 106. The GUI 800 may indicate the counter flow direction (or flow direction). For example, the primary counter-flow direction (e.g., center angle of the range of counter-flow directions) may be indicated by a graphic 802, which is overlaid on the video 801. In another example, the counter-flow direction may be indicated by another graphic 803, which illustrates the range of angles comprising the counter-flow direction. These indications may be activated/deactivated using a counter-flow filter 804.

The GUI may also include a timeline 805 with a cursor 806 that indicates the point (i.e., frame) of the video being displayed. The counter-flow motion detected in the video may be indicated 807a, 807b, 807c with the timeline 805, wherein the horizontal extent of the indication 807a, 807b, 807c provides information corresponding to the duration of the counter-flow motion, while the vertical extent of the indication 807a, 807b, 807c provides information corresponding to the extent of the counter-flow motion as described above. The indications 807a, 807b, 807c of counter-flow motion may allow a user to quickly navigate to portions of the video having counter-flow motion.

A variety of possibilities exists for interacting with video in which the counter-flow motion is identified. For example, the filter control 804 may allow a user to play only portions of the video having counter-flow motion.

In the specification and/or figures, typical embodiments have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A method for determining a flow direction for a group of frames in compressed video comprising:
   obtaining motion vectors from a frame in the group of frames, wherein each motion vector comprises a magnitude and an angle,
   filtering the motion vectors to remove motion vectors that correspond to noise,
   computing a frame histogram of the angles of the motion vectors,
   deriving a frame direction based on the frame histogram,
   adding the frame direction to a flow histogram of frame directions,
   repeating the obtaining, filtering, computing, deriving, and adding for other frames in the group of frames, and
   determining a flow direction based on the flow histogram of frame directions.

2. The method according to claim 1, wherein each frame in the compressed video comprises macroblocks that each have a motion vector indicating the macroblock's motion relative to a reference frame, wherein the motion vector's magnitude corresponds to the displacement of the motion and the motion vector's angle corresponds to the direction of the motion.

3. The method according to claim 1, wherein the computing a frame histogram of the angles of the motion vectors comprises:
   binning the angles of the motion vectors into equal-sized bins that span from zero to 360 degrees.

4. The method according to claim 3, wherein the binning may be weighted by the corresponding magnitude of the motion vector.

5. The method according to claim 3, wherein the number of equal sized bins spanning zero to 360 degrees is based on an expected variation in the angles of the motion vectors.

6. The method according to claim 3, wherein the deriving a frame direction based on the frame histogram comprises:
   selecting the two largest adjacent bins;
   determining an average bin value based on bin counts in each of the two largest adjacent bins; and
   deriving a frame direction as the angle corresponding to the average bin value.

7. The method according to claim 1, wherein the filtering the motion vectors to remove motion vectors that correspond to noise comprises:
   receiving an expected magnitude range; and
   removing motion vectors that are larger or smaller than the expected magnitude range.

8. The method according to claim 1, wherein the group of frames comprises only frames of the compressed video in which motion is detected, wherein the detection of motion is based on the motion vectors in each frame.

9. The method according to claim 1, wherein the flow of the histogram is determined by comparing motion vectors obtained for each frame to a reference flow direction.

10. The method according to claim 1, further comprising:
    binning the frame directions into equal-sized bins that span from zero to 360 degrees;
    selecting the two largest adjacent bins; and
    determining the flow direction as a range of angles corresponding to the two largest adjacent bins.

11. The method according to claim 10, wherein the number of frames in the group of frames is determined when the two largest adjacent bins in the flow histogram have values larger than all other bins by an amount greater than a frame threshold.

12. The method according to claim 1, further comprising continuously updating the group of frames using a sliding window to select the group of frames.

13. The method according to claim 1, further comprising:
    creating a motion mask for each frame of the compressed video wherein each pixel of the motion mask can have one of two values: a first value corresponding to a counter-flow motion and a second value corresponding to motion other than counter-flow motion.

14. The method according to claim 13, further comprising:
    tagging a frame as having counter-flow motion when the number of pixels in the motion mask that have the first value exceeds a counter-flow motion threshold.

15. The method according to claim 14, further comprising:
    determining the extent of counter-flow motion in the tagged frame as the percentage of the pixels in the motion mask that have the first value.

16. The method according to claim 15, further comprising:
    triggering an alarm when a number of consecutive frames tagged as having counter-flow motion exceeds a first alarm threshold or when the extent of the counter-flow motion in a tagged frame exceeds a second alarm threshold.

17. The method according to claim 15, further comprising:
    updating a graphical user interface (GUI) of a video management system (VMS) with an indication of the frames of the compressed video of the scene that are tagged as having counter-flow motion and with an indication of the extent of the counter-flow motion in each tagged frame.

18. A video surveillance system having flow motion detection, the system comprising:
    at least one video camera capturing video of a scene;
    a video processing unit (VPU) communicatively coupled to the at least one video camera that processes the video to form a compressed video; and
    a video management system (VMS) communicatively coupled to the VPU, wherein the VMS comprises a memory storing software and a processor that is configured by the software to:
    receive the compressed video of the scene, wherein the compressed video comprises frames;

determine a flow direction for a group of frames in the compressed video, wherein the determining comprises:
  obtaining motion vectors from a frame in the group of the frames, wherein each motion vector comprises a magnitude and an angle;
  filtering the motion vectors to remove motion vectors that correspond to noise,
  computing a frame histogram of the angles of the motion vectors;
  deriving a frame direction based on the frame histogram;
  adding the frame direction to a flow histogram of frame directions,
  repeating the obtaining, filtering, computing, deriving, and adding for other frames in the group of frames; and
  determining a flow direction based on the flow histogram of frame directions.

19. A non-transitory computer readable medium containing computer readable instructions that when executed by a processor of a computing device cause the computing device to perform a method for determining a flow direction for a group of frames in compressed video comprising:
  obtaining motion vectors from a frame in the group of frames, wherein each motion vector comprises a magnitude and an angle;
  filtering the motion vectors to remove motion vectors that correspond to noise;
  computing a frame histogram of the angles of the motion vectors;
  deriving a frame direction based on the frame histogram;
  adding the frame direction to a flow histogram of frame directions;
  repeating the obtaining, filtering, computing, deriving, and adding for other frames in the group of frames; and
  determining a flow direction based on the flow histogram of frame directions.

\* \* \* \* \*